3,582,525
**ELECTROLYTE MANIFOLD FOR ELECTRO-
CHEMICAL MACHINING**
Robert S. Hahn, Northboro, Mass., and Charles Evans
Foertmeyer, Cincinnati, Ohio, assignors to Cincinnati
Milacron Inc., Cincinnati, Ohio
Filed Nov. 29, 1967, Ser. No. 686,430
Int. Cl. B23p 1/04; B01k 3/00
U.S. Cl. 204—224                                    3 Claims

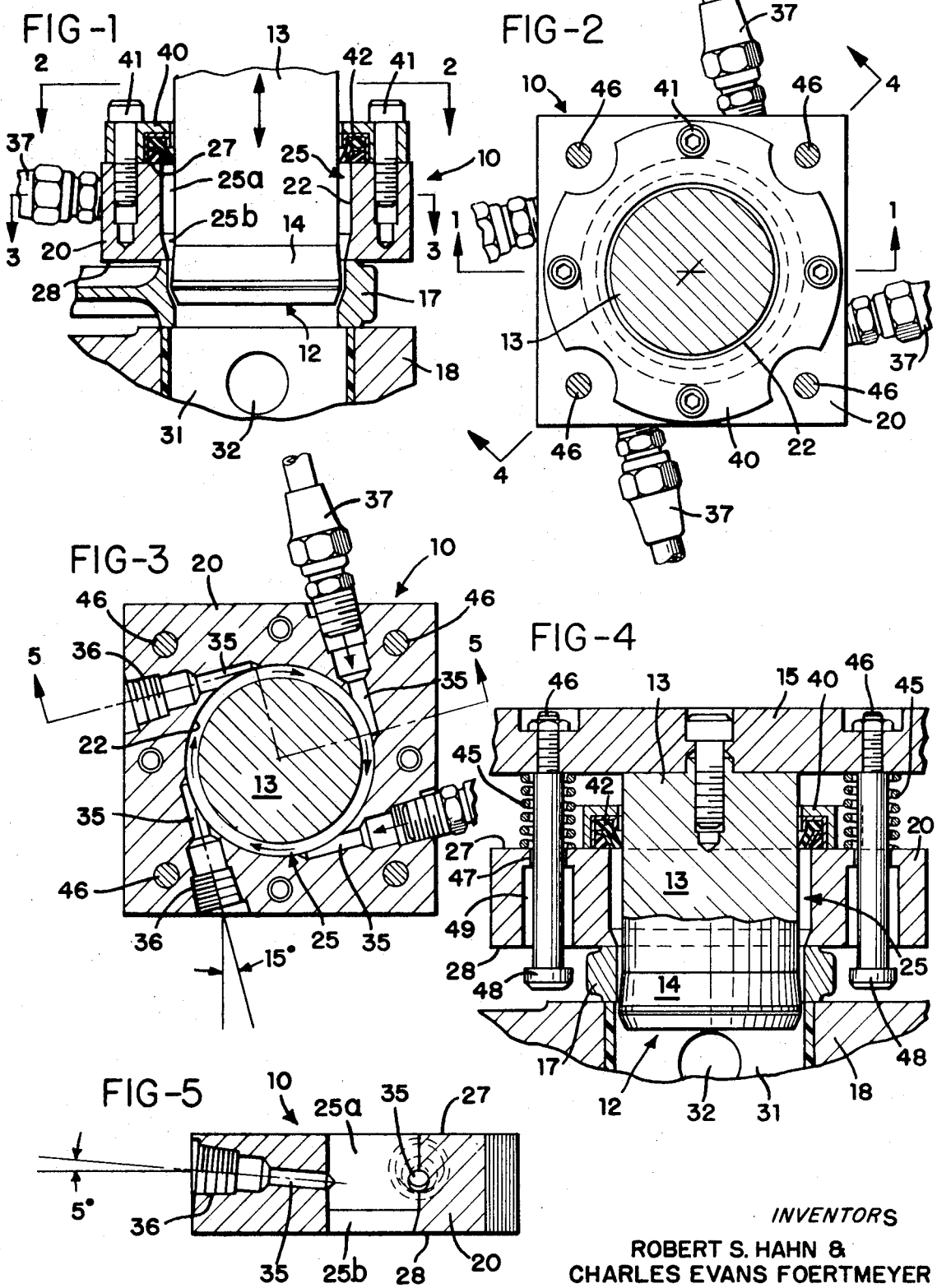

ABSTRACT OF THE DISCLOSURE

An electrolyte manifold for use in an electrochemical machining apparatus where previously formed workpieces are machined to precise dimensions by a tool includes a body member surrounding the electrochemical machining tool having a chamber of generally circular cross section into which the electrolyte is injected so that it flows tangentially around the tool and smoothly and uniformly into the space between the tool and the workpiece.

RELATED APPLICATIONS

Reference is hereby made to copending U.S. applications Ser. No. 626,901 entitled, Electrochemical Machining Tool; Ser. No. 626,732 entitled, Apparatus for Simultaneously Electrochemically Machining a Plurality of Previously Formed Surfaces of a Workpiece, both filed Mar. 29, 1967.

BACKGROUND OF THE INVENTION

In an electrochemical machining operation described in the above mentioned applications, a tool is advanced into an electrically conductive workpiece and an electrical potential is applied to make the workpiece anodic with respect to the tool. Electrolyte is directed between the tool and the workpiece to provide a path for the electrical current, to remove the reaction products of the electrochemical machining action, and to remove the heat generated by the flow of electrical current. Any discontinuity or turbulence in electrolyte flow might cause uneven machining of the workpiece with the result that flow lines and other discontinuities may appear on the surface finish of the workpiece.

SUMMARY OF THE INVENTION

This invention relates to an electrolyte manifold for supplying a smooth, uniform and uninterrupted flow of electrolyte into the space between an electrochemical machining tool and an electrically conductive workpiece. The electrolyte is directed to this space under pressure in order to increase the volume of flow of the electrolyte, to insure that the reaction products of the electrochemical machining action are removed, where the anodic products may be filtered and the electrolyte recirculated, and to provide a vehicle to carry away the heat generated during the machining action. Additionally, a high volume of electrolyte insures that fresh electrolyte at the optimum machining temperature is always present between the tool and the workpiece so that accurate dimensions and smooth surface finishes on the workpiece may be obtained.

Accordingly, it is an object of this invention to provide an electrolyte manifold including a housing having a cavity, generally circular in cross section, formed therein which surrounds the tool and tool holder and which includes means to direct electrolyte into the cavity tangentially around the tool and toward the space between the tool and the workpiece so that a smooth, uniform and uninterrupted flow of electrolyte is present in the area in which the electrochemical machining action occurs.

BRIEF DESCRIPTION OF THE DRAWINGS

FIG. 1 is a cross sectional elevational view showing the relationship of the electrolyte manifold of this invention to the tool, workpiece holder, the workpiece, and the workpiece fixture;

FIG. 2 is a plan view of the electrolyte manifold taken along line 2—2 in FIG. 1;

FIG. 3 is a cross sectional plan view of the electrolyte manifold and workpiece holder taken along line 3—3 in FIG. 1;

FIG. 4 is a cross sectional elevational view taken along line 4—4 in FIG. 2, showing the electrolyte manifold mounted on the tool support mechanism; and FIG. 5 is a cross sectional view of the electrolyte manifold taken along line 5—5 in FIG. 3.

DESCRIPTION OF THE PREFERRED EMBODIMENT

Referring now to the drawings, and particularly to FIGS. 1 and 4, the electrolyte manifold 10 is shown surrounding the tool 12 including a tool holder 13 and an electrochemical machining head 14 of the type shown and described in the above mentioned United States application Ser. No. 626,901. Both the tool holder 13 and the electrolyte manifold 10 are mounted to a tool support mechanism 15. The electrolyte manifold 10 sealingly engages a workpiece 17 which in turn is mounted on a workpiece support 18. While not shown, means are provided to supply electrical current between the tool and the workpiece, with the workpiece functioning as an anode electrode resulting in the electrochemical removal of the workpiece material under dimensional control of the tool 12. A more complete description of the tool support and the workpiece support may be found in the above mentioned United States patent application Ser. No. 626,732.

The electrolyte manifold 10 is formed from a body member 20 having an interior surface 22, generally circular in cross section, which surrounds the tool 12 and tool holder 13. The space between the body 20 and the tool and tool support defines a chamber 25 into which the electrolyte is introduced. In the preferred embodiment of this invention, the electrolyte manifold 10 is made of an electrically insulating material, such as plastic, since it is physically mounted on the tool support 15 which is electrically negative with respect to the workpiece 17.

The chamber 25 is divided into two parts in the preferred embodiment, the first part 25a being generally cylindrical and extending from the top surface 27 of the body member 20 for a substantial distance into the body member, and a second part 25b being generally conical having its largest diameter equal to the diameter of the cylindrical portion 25a and tapering inwardly and extending through the bottom surface 28. The cross sectional diameter of the chamber 25 at the lower surface 28 is made to equal substantially the diameter of the finished opening to be machined in the workpiece 17.

The electrolyte manifold 10 of this invention is particularly useful where the workpiece 17 has preformed therein an opening which is to be enlarged to the desired size through the electrochemical machining action by the tool 12. Thus, electrolyte is directed into the electrolyte chamber 25 and flows around the tool and spirals downwardly with increasing velocity until it enters into the space between the tool and the workpiece and then flows into the cavity 31 in the workpiece support fixture 18. The electrolyte then flows out through the electrolyte exit port 32 where it is cooled, filtered, and then pumped back into the electrolyte manifold.

Smooth and uniform flow of electrolyte over the surface of the tool is essential to accurate machining of the workpiece and it is for this reason that discontinuities in the flow path of the electrolyte is eliminated or made as small as possible. For example, in the construction of the tool, as explained in detail in the above mentioned U.S. patent application Ser. No. 626,901, the surfaces of the tool are continuous with no sudden changes in direction of the electrolyte flow are required as it flows over the machining surfaces of the tool to insure that electrolyte continuously contacts both the machining surfaces of the tool and the machined surfaces of the workpiece. In like manner, forming the opening of the second part 25b of the electrolyte chamber to substantially the same diameter as the desired finished diameter of the tool 17 will minimize the amount of turbulence which may otherwise exist in the space between the tool and the workpiece.

Electrolyte is directed into the cavity 25 in the preferred embodiment by means of four electrolyte inlet tubes 35. These inlet tubes extend from the exterior surface of the body member into the chamber 25 through the interior surface 22 with the axis of each opening or tube intersecting the chamber tangentially thereto. Each of the inlet tubes 35 is enlarged near the exterior surface and threaded at 36 to accommodate a fitting 37, as shown in FIG. 3. Each of the inlet tubes 35 is shown extending at an angle of approximately 15° to a line perpendicular to the outer surface of the body member 20. This angle may be varied depending upon the size of the chamber 25 and the number of electrolyte inlet tubes used. Of course, the electrolyte inlet tubes could be formed perpendicular to the outer wall of the body 20, however, this would place the inlet tubes close to the corners and it is for this reason that they are arranged as shown.

As shown in FIG. 5, each electrolyte inlet tube 35 is also directed downwardly at an angle of from approximately 5° to 20° to the plane perpendicular to the direction of motion of the tool relative to the workpiece. Thus, as the electrolyte is forced into the chamber 25, it rotates in the direction of the arrows shown in FIG. 3 and thus completely surrounds both the tool holder and the tool, and since the inlet tubes are directed downwardly, the electrolyte is positively urged into the space between the tool and the workpiece. This arrangement is deemed preferred since it permits a smooth and uniform flow of electrolyte over all of the machining surfaces of the tool and forces the electrolyte against the surfaces of the workpiece which are being machined.

An electrolyte seal 40 is secured by bolts 41 or other similar means to the top surface of the body member 20. This seal is of conventional design and includes a rubber ring 42 which surrounds the tool holder 13 and which is urged into engagement of the tool holder by either a plurality of metal fingers or a coil spring (not shown). The seal 42 is oriented such that as electrolyte pressure increases in the chamber 25, the seal is urged into tighter engagement with the tool holder 13 while permitting the tool holder freely to move downwardly during the electrochemical machining operation.

The bottom surface 28 of the body member 20 is placed into sealing engagement with the workpiece 17 by means of four springs 45, two of which are shown in FIG. 4. While a friction seal is contemplated in the present invention between the bottom surface 28 of the body and the top surface of the workpiece 17, an O-ring seal mounted in the bottom surface 28 might be provided if a tighter seal is desired.

The electrolyte manifold 10 is mounted to the tool support mechanism 15 on the four guide rods 46. These guide rods are bolted or otherwise secured to the tool support mechanism and extend through the springs 45 and through an opening 47 in the body member 20. The head 48 of each rod may be received into an expanded opening 49 concentric with the opening 47. The head 48 abuts the innermost extent of the expanded opening 49 to limit the downward travel of the manifold with respect to the rod 46. The springs 45 urge the manifold downwardly with sufficient preloading when in the extended position that the lower surface 28 of the manifold sealingly engages the upper surface of the workpiece.

Thus, as the tool support 15 initially moves downwardly, the lower surface of the manifold first sealingly engages the workpiece, and then the tool 12 begins to penetrate into the preformed opening in the workpiece and initiate the electrochemical machining operation. The electrolyte is simultaneously forced into the four electrolyte inlet tubes 35 and flows clockwise, as viewed in FIG. 3, into the chamber 25 and then downwardly into the space between the tool 12 and the workpiece 17.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In electrochemical machining apparatus for machining to precise dimensions a previously formed opening in a workpiece include an electrochemical machining tool, and means for introducing electrolyte into the space between the tool and the workpiece, the improvement comprising a body member surrounding said tool and adapted to fit in sealing engagement with the workpiece, said body member including an inner surface generally circular in cross section forming in combination with said electrochemical machining tool an electrolyte chamber;

means for introducing electrolyte tangentially into said chamber to direct a smooth and uniform flow of electrolyte around said tool and into the space between said tool and the workpiece, including means defining a plurality of openings each extending from the exterior surface of said body member into said chamber, the axis of each opening intersecting the chamber tangentially thereto; and means providing an electrolyte seal between said body member and said electrochemical machining tool to prevent the loss of electrolyte from said chamber while permitting relative movement of said tool with respect to said body member.

2. The apparatus of claim 1 wherein said means for introducing electrolyte into said chamber includes means defining a plurality of openings each extending from the exterior surface of said body member into said chamber, the axis of each opening intersecting the chamber tangentially thereto with each opening directing electrolyte toward the space between said tool and the workpiece at an angle with a plane perpendicular to the direction of relative movement of said tool and the workpiece so that the electrolyte is directed to flow smoothly and uniformly into said space.

3. The apparatus of claim 1 wherein said inner surface in the body member is formed from a cylindrical surface and a conical surface, said conical surface extending through the surface of said body member engaging the workpiece and having its largest diameter equal to and adjoining the cylindrical surface and its smallest diameter adjoining the workpiece so that the electrolyte increases in velocity as it moves into the space between said tool and the workpiece.

References Cited

UNITED STATES PATENTS

| | | | |
|---|---|---|---|
| 2,181,490 | 11/1939 | Lowe | 204—228X |
| 2,406,956 | 9/1946 | Matthews | 204—272 |
| 2,431,948 | 12/1947 | Martz | 204—272 |
| 3,399,125 | 8/1968 | Mikoshiba et al. | 204—224X |
| 3,429,798 | 2/1969 | Beck et al. | 204—224X |

JOHN H. MACK, Primary Examiner

D. R. VALENTINE, Assistant Examiner

U.S. Cl. X.R.

204—272, 275